Figure 1:
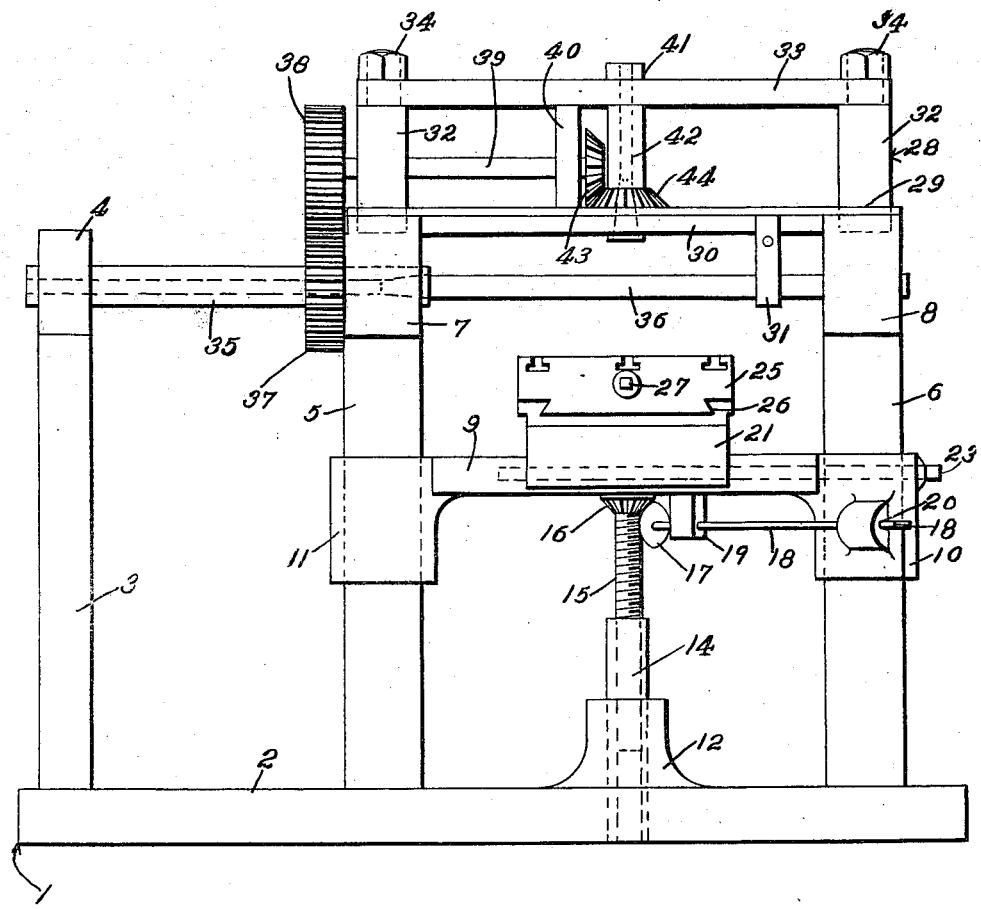

Feb. 26, 1924.

H. H. BARROWS 1,485,209

MILLING MACHINE

Filed Nov. 8, 1920

2 Sheets-Sheet 1

Inventor

H. H. Barrows.

By C. A. Snow & Co.

Attorneys

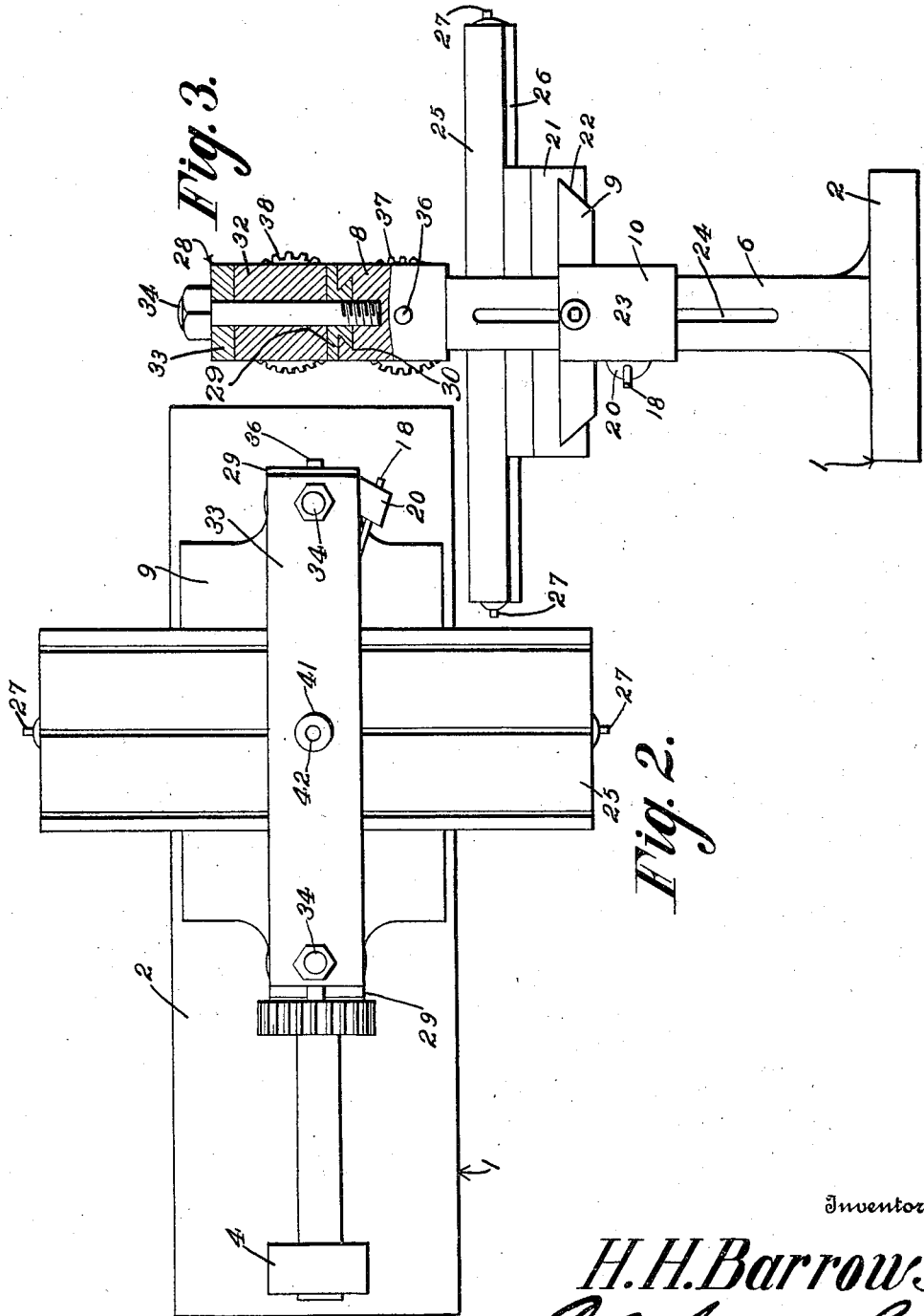

Patented Feb. 26, 1924.

1,485,209

UNITED STATES PATENT OFFICE.

HUBERT HENRY BARROWS, OF SAN BERNARDINO, CALIFORNIA.

MILLING MACHINE.

Application filed November 8, 1920. Serial No. 422,628.

*To all whom it may concern:*

Be it known that I, HUBERT HENRY BARROWS, a citizen of the United States, residing at San Bernardino, in the county of San Bernardino and State of California, have invented a new and useful Milling Machine, of which the following is a specification.

By way of explanation it may be stated that milling machines having a horizontal spindle, are provided with an attachment carrying a vertical spindle. The attachment which carries the vertical spindle weighs, often, five hundred pounds, and, since it is necessary to attach and remove the frame which carries the vertical spindle, a large amount of work, necessarily, is involved. The foregoing being understood, it may be stated that one object of the invention is to provide a milling machine having both vertical and horizontal spindles, the machine being of unusual strength and being well adapted to withstand the severe use to which milling machines are subjected.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the drawings:—

Figure 1 shows in side elevation, a milling machine constructed in accordance with the invention; Figure 2 is a top plan of the machine; Figure 3 is an end elevation of the machine.

In carrying out the invention there is provided a main frame 1 including a base plate 2 carrying a post 3 having a bearing 4, there being standards 5 and 6 on the base, the standard 5 having a head 7, and the standard 6 having a head 8. The numeral 9 denotes a table located between the standards 5 and 6 and provided with a sleeve 10 slidable on the standard 6, the table having a sleeve 11 slidable on the standard 5, the construction being such that the table 9 may be raised and lowered. A socket 12 is mounted on the base plate 2 and carries a tubular bearing 14 whereinto is threaded a screw 15 connected at its upper end, for rotation, with the table 9. There is a beveled pinion 16 on the screw 15, the beveled pinion 16 meshing into a beveled pinion 17 on a shaft 18 journaled in a hanger 19 on the table 9, and in a lug 20 on the sleeve 10.

A lower carriage 21 is dove-tailed at 22 on the table 9 for sliding movement longitudinally of the table, between the standards 5 and 6. A feed screw 23 is journaled for rotation, after the common custom, in the table 9, and is journaled in the sleeve 10, the feed screw 23 being connected operatively with the lower carriage 21, so that when the feed screw is rotated, the lower carriage may be moved longitudinally of the table 9, between the standards 6 and 5. The standard 6 has a vertical slot 24 receiving the feed screw 23, to the end that the feed screw may not interfere with the raising and lowering of the table 9. The numeral 25 denotes an upper carriage dove-tailed at 26 upon the lower carriage 21 for sliding movement transversely of the table 9, that is, at right angles to a line connecting the standards 5 and 6. A feed screw 27 is held for rotation in the upper carriage 25, and is connected operatively to the lower carriage 21 so that, through the instrumentality of the feed screw, the upper carriage may be moved on the lower carriage.

The numeral 28 designates, generally, an auxiliary frame fixed to the main frame 1, the auxiliary frame including a base bar 29 having a rib 30 dove-tailed into the heads 8 and 7 of the standards 6 and 5 of the main frame, the base bar 29 carrying a depending bracket 31. There may be any desired number of these brackets. Posts 32 are supported on the base bar 29 and carry a cap 33. Securing devices 34 extend downwardly through the cap 33 and through the posts 32, the securing devices entering the heads 8 and 7, to hold the auxiliary frame fixed on the main frame. A bearing 40 extends between the cap 33 and the base bar 29.

A tubular shaft 35 is journaled for rotation in the bearing 4 of the post 3 and in the head 7 of the standard 5. Any desired driving mechanism (not shown) may be supplied for imparting rotation to the shaft 35. An arbor 36 is mounted to rotate in the head 8 and in the bracket 31, the inner end of the arbor 36 being seated detachably in the shaft 35, so that when the shaft 35 is rotated, rotation will be imparted to the arbor. A pinion 37 is fixed to the shaft 35 and meshes into a gear wheel 38 secured to a shaft 39 journaled in one of the posts 32 and in the bearing 40. On the inner end of the shaft 39 is mounted a beveled pinion 43. A vertical shaft or spindle 41 is mounted to rotate in the cap 33 and in the base bar 29 and has a socket 42 for the reception of a tool. A beveled pinion 44 is secured to the shaft 41 and is supported on the base bar 29, the beveled pinion 44 meshing into the beveled pinion 43 on the shaft 39.

In practical operation, a tool of any desired sort may be mounted in the socket 42 of the shaft 41, at the lower end of the shaft, the tool being adapted to cooperate with the work on the carriage 25. Likewise, a tool may be mounted on the horizontal arbor 36, for cooperating with the work on the carriage 25. When the shaft 41 and its tool are in use, the arbor 36 may be slid endwise out of engagement with the shaft 35, and may be withdrawn from the machine. It is obvious that the withdrawal of a light part, such as the arbor 36, is an operation brought about with much less effort than is incident to the lifting off of a heavy frame or attachment, carrying the vertical spindle, after the common and present custom.

When rotation is imparted to the shaft 35, the shaft rotates the arbor 36. Rotation is imparted from the shaft 35 to the shaft 41 by a train including the pinion 37, the gear wheel 38, the shaft 39, the beveled pinion 43 and the beveled pinion 44.

When the shaft 18 is rotated, the beveled pinion 17 rotates the screw 15 by way of the beveled pinion 16, the screw 15 moving upwardly or downwardly, because it is threaded into the part 14. When the screw 15 is rotated, the table 9, and, consequently, the carriages 21 and 25, will be raised and lowered, thereby to position the work properly, so far as vertical adjustment is concerned, with respect to the arbor 36 or the shaft 41. The lower carriage 21 and the upper carriage 25 may be moved longitudinally on the table 9, through the instrumentality of the feed screw 23. Further, the upward carriage 25 may be moved on the lower carriage 21, transversely of the table 9, by way of the feed screw 27.

Having thus described the invention, what is claimed is:—

In a device of the class described, a main frame comprising standards, an auxiliary frame including a base bar supported on the standards, a cap, posts cooperating with the base bar and the cap, and securing elements passing through the cap, the posts and the base bar and connecting them with the standards, a first horizontal shaft journaled in one standard, a second horizontal shaft journaled in one post, means for connecting the shafts, a vertical shaft journaled in the base bar and in the cap, intermeshing beveled pinions on the second horizontal shaft, and on the vertical shaft, the pinion of the vertical shaft being supported on the base bar, and the pinions being located between the base bar and the cap, work-supporting means adjustable on the standards, and an arbor journaled in one standard and insertable therethrough from a point outside of the main frame for engagement with the first horizontal shaft, the arbor extending entirely across the work-supporting means, and the work-supporting means being located below the vertical shaft.

In testimony that I claim the foregoing as my own, I have hereto affixed my signature in the presence of two witnesses.

HUBERT HENRY BARROWS.

Witnesses:
CHAS. PERRY,
LISL ESLER.